Jan. 19, 1965  R. W. LOGAN  3,165,833
FLAYING TOOL
Filed Nov. 27, 1962

INVENTOR
Richard W. Logan
Ronald T. Kjerulf
and Newton H. Williams
BY Spencer, Rockwell & Bartholow
ATTORNEY ced Jan. 19, 1965

3,165,833
FLAYING TOOL
Richard W. Logan, York, Maine, Ronald T. Kjerulf, East Wakefield, N.H., and Newton H. Williams, Newtown, Conn., assignors to Packers Development Corporation, Rochester, N.H.
Filed Nov. 27, 1962, Ser. No. 240,262
4 Claims. (Cl. 30—206)

This invention relates to a flaying tool employing a pair of relatively movable cutter blades each provided with peripheral cooperating teeth.

Flaying tools used at the present time in the removal of hides from slaughtered animals generally comprise a frame in which are oscillatably mounted a pair of superimposed blades having cooperating peripheral teeth. These blades may be circular with teeth mounted about their entire periphery or the peripheries of the blades may define less than a complete circle. The blades are oscillated in opposite directions and a portion of the periphery of each blade is exposed so that it may be used for its intended purpose of separating an animal hide from the carcass. The cooperating blades are commonly oscillatable about a common pivotal axis and are of substantially the same outline. The frame or casing is tubular or hollow so as to receive an actuating shaft connectable to an eccentric crank mechanism for effecting oscillatory movement of the blades in opposite directions so as to obtain a shearing action between the peripheral teeth thereof.

While these presently known implements are successfully used in removing hides from animal carcasses, they only efficiently utilize a small portion of the potential cutting periphery of the blades (or are provided with only a small cutting periphery) due to the fact that the blades are relatively oscillatable and the peripheries of these blades move only a small distance before reversing direction. Due to the oscillatory motion of the blades, they do not move at a constant angular velocity and such flaying implements do not provide as efficient a cutting effect as might be obtained from blades which move at a constant angular velocity.

Moreover, considerable reversal of direction of the oscillating blades, together with attendant inertial starting and stopping forces thereon lead to rapid wear on the elements of the driving mechanism. The oscillatory operation of these tools also produces vibration thereof which may be fatiguing to the operator.

The present invention provides a flaying tool having relative movable disk-like blades having only relatively rotatable motion wherein the cutting edges may move at a constant velocity and are not subjected to periodic stop and start forces. Inasmuch as the cutting edges move at a substantially constant velocity, a more efficient cutting action is obtained with less vibration of the instrument as compared to oscillatable-blade flaying tools. Also, where both blades are counter rotating, more cuts per unit time, i.e. more passages of cutting edges, can be obtained without increasing the speed of the driving element. Moreover, in one embodiment of the invention where one of the blades is stationary and the other rotatable, if the stationary blade is held adjacent to the skin of the carcass there will be less tendency to cut the hide.

Accordingly, it is an object of this invention to provide a new and improved flaying tool having disk-like blades with teeth about the entire periphery thereof where the entire periphery of the blades is utilized in any cutting operation.

It is another object of this invention to provide a flaying tool of the type described having a new and improved mechanism for rotatably driving the cutting blades.

It is a further object of this invention to provide a flaying tool wherein the cutting edges move at a constant velocity.

It is a still further object of this invention to provide a new and improved flaying tool wherein disk-like, superposed blades having cooperating peripheral teeth, in which at least one of the blades is rotated at a constant angular velocity.

The features of the invention, which are believed to be novel, are pointed out with particularity in the claims appended to and forming part of this specification. However, the invention, both as to organization and operation, together with further objects and advantages thereof may best be appreciated by reference to the following description taken in conjunction with the drawings wherein:

Figure 1:
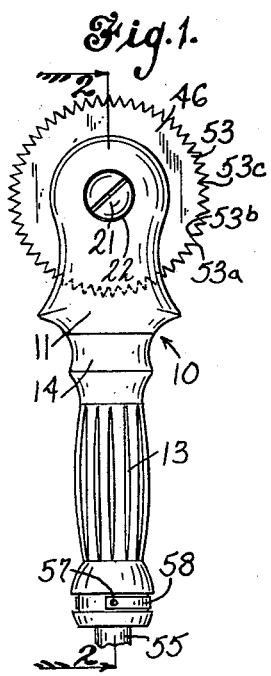
FIG. 1 is a plan view of a flaying instrument embodying the invention.

To illustrate one preferred embodiment of the invention, there is shown in FIGS. 1–4 a flaying tool having a casing or frame 10 comprising cap members 11 and 12 and a hollow handle 13. Cap member 12 has a base or socket portion 14 thereon which receives and mounts cap portion 11 to cap portion 12. A plurality of aligning pins 15 (only one shown) are received in aligned sockets 16 and 17 (only one of each shown) in socket portion 14 and cap member 11, respectively. Handle 13 is provided with external threads 18 adjacent shoulder 19 which receive thereon the internal mating threads 20 of socket portion 14. Shoulder 19 also provides a seat or stop for socket portion 14 on handle 13. Cap member 11 is further secured to cap member 12 by means of a threaded bolt 21 received in recess 22 defined in cap member 11 and extending through cap member 12 to threadly receive a nut 23 thereon in recess 24 defined in cap member 12.

Longitudinally extending in the hollow handle 13 is a drive shaft 25 supported at one end thereof in bearing assembly 26 and having a threaded portion 27 extending therethrough into an adaptor member 28 for connecting shaft 25 to a drive means, hereinafter described. Drive shaft 25 is supported towards the other end thereof by means of a bearing assembly 29, and has a sleeve 30 thereabout provided for proper spacing of bearing assembly 26 and 29. Bearing assembly 29 is further positioned by means of a radially inwardly extending ledge 31 on socket portion 14, and bearing assembly 26 is further posiitoned by a radial shoulder 32 extending inwardly from hollow handle member 13.

Mounted on one end of drive shaft 25 within cap members 11 and 12 is a beveled pinion 33, adapted to be driven by drive shaft 25. Pinion 33 drivingly engages a bevel gear rotatably mounted on a stud 35 secured in cap member 12. Secured to bevel gear 34 or formed integrally therewith at the upper surface thereof about stud 35 is a spur gear 36 which engages an idler gear 37 rotatably mounted on a stud 38 secured in cap member 12. Idler gear 37 drivingly engages a driving gear 39 which is secured to disk-like cutter blade 40 by means of a pin 41 received in aligned apertures in both blade 40 and gear 39. Both gear 39 and blade 40 are rotatably mounted on a pivot pin 42 surrounding bolt 21. Pivot pin 42 has a flange 43 defining a channel 44 about pivot pin portion 41, which channel receives a circular corrugated spring 45 for purposes hereinafter described.

Also mounted about pivot pin 42 is a disk-like blade 46 of the same diameter as blade 40. The axis of pin 42 and bolt 21 defines the rotational axis of blade 40 and also the axis of blade 46. Secured to blade 46 by means of a pin 47 extending therethrough is a plate member 48 having a cut out or slot 49 opposite pin 47. Aligned apertures are provided in blade 46 and plate member 48 to receive pin 47. Mounted in cap member 11 is a pin 51 which extends into slot 49 and prevents rotation of plate member 48 and blade 46 secured thereto.

A flange member 52 is included between plate member 48 and cap member 11 for spacing purposes. The annular corrugated spring 45 disposed between the flange 43 and gear 39, through gear 39, urges the adjacent blades 40 and 46 into contact so that the teeth of the blades at the periphery thereof will properly cooperate. In order that the teeth of the blades be in contact and at the same time be subjected to only a minimum amount of friction between the blades when the tool is in use, blades 40 and 46 may be slightly dished on their inner adjacent surfaces, as disclosed in U.S. Patent 2,974,413, so that while the blades will be in contact over their peripheral portions the intermediate portions thereof will be slightly out of contact thus reducing surface contact between the blades and frictional forces tending to retard relative rotation thereof.

Each of the blades 40 and 46 has triangular shaped teeth 53 about the entire periphery thereof defining apexes 53a and valleys 53b and cutting edges 53c therebetween (FIG. 1). When the blades 40 and 46 are relatively rotated, the teeth of one blade in passing the teeth of the other blade produce a cutting or shearing action which will efficiently cut the connective tissue, between the skin and the meat of an animal carcass.

In the embodiment of the invention thus far disclosed, blade 40 is rotatively driven through the gear train comprising pinion 33 and gears 34, 36, 37 and 39 while blade 46 is held stationary by virtue of its connection to plate member 48, and pin 51 preventing rotation of plate member 48.

To drive shaft 25, a polygonal shaft 54 may be fitted into adaptor member 28 and matingly received therein. Shaft 54 may be received by a bushing 55 having an annular recess 56 receiving a pin 57 carried by one end of a spring 58 secured in handle 13. Shaft 54 may be connectable to or an extension of a flexible shaft, not shown, or other suitable means for shaft 25. The driven cutting blade will rotate at a speed proportional to the speed of drive shaft 25. In operation, the drive shaft will rotate at a constant speed and therefore the velocity of teeth 53 of blade 40 will be constant.

The embodiment of the invention thus far disclosed having one rotating and one stationary blade, presents the advantage that there will be less likelihood of cutting into the portion of an animal carcass adjacent the stationary blade. Thus, where it is desirable to separate the hide from the meat and salvage the hide for other use, the disclosed flaying tool may be utilized with the stationary blade adjacent the hide.

Figure 2:
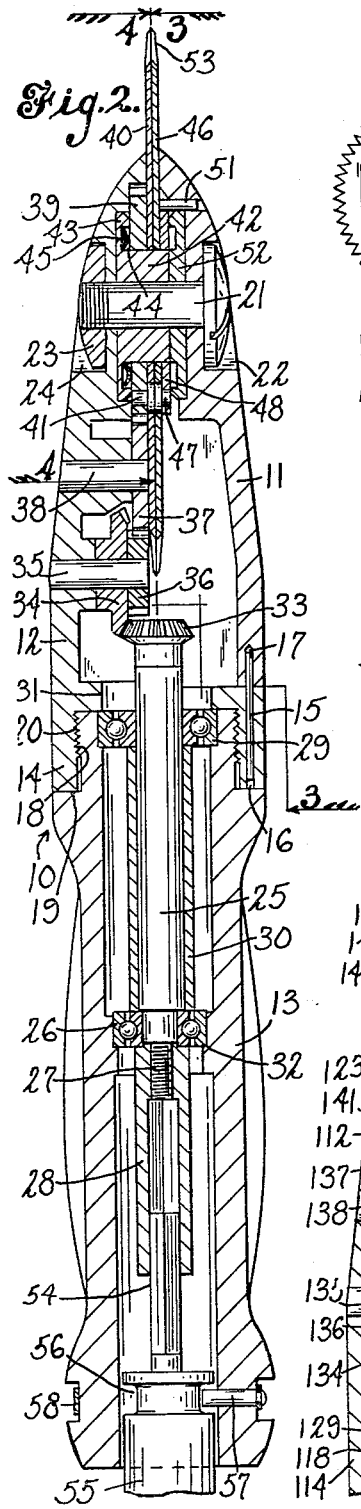
FIG. 2 is an enlarged sectional view taken along line 2—2 of FIG. 1.
Figure 5:
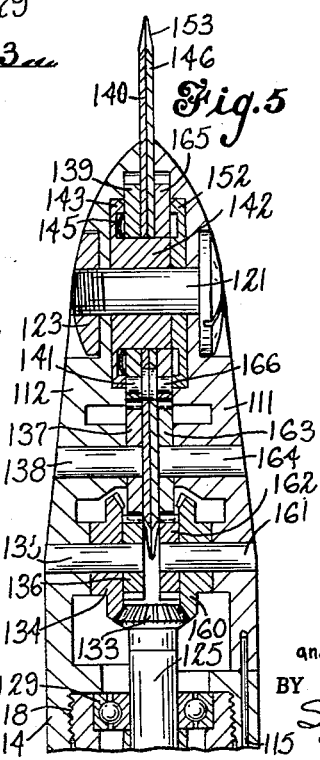
FIG. 5 is a sectional view, similar to FIG. 2, of another flaying tool embodying the invention in which both blades rotate in opposite directions.

FIG. 5 illustrates, in a sectional view similar to FIG. 2, a flaying tool embodying the invention wherein both of the blades are arranged for continuous rotation in opposite directions. The flaying tool of FIG. 5 and the elements thereof corresponding to the elements of the flaying tool of FIG. 2 bear the same identifying reference numerals raised by 100. Inasmuch as the elements carried by cap member 112 are identical to those carried in cap number 12 of FIG. 2, no further description of the elements within cap member 112 or the combinations thereof is deemed necessary.

Figure 3:
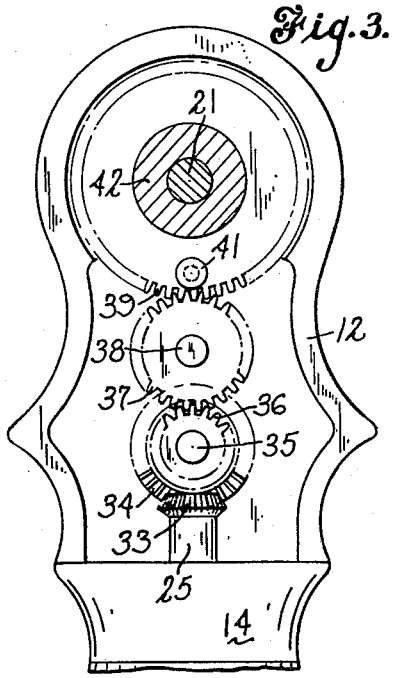
FIG. 3 is a sectional view taken along line 3—3 of FIG. 2, with a cutting blade removed.
Figure 4:
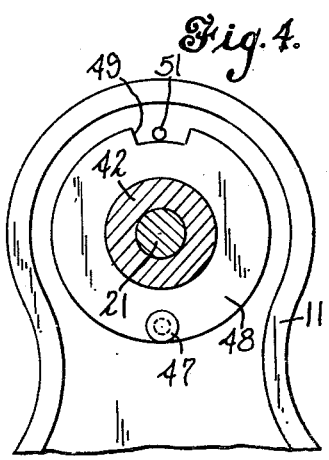
FIG. 4 is a sectional view taken along line 4—4 of FIG. 2 with a cutting blade removed.

In the flaying tool of FIG. 5 cap member 111 includes therein a blade-drive mechanism for blade 146 which is essentially a duplicate of the drive-mechanism for blade 140 carried in cap member 112. Blades 140 and 146 are rotatable about a common axis provided by pin 142. A beveled pinion 133 drivingly engages a pinion gear 160 rotatably mounted on a stud 161 in cap member 111. Secured to pinion gear 160 or formed integral therewith, is a spur gear 162 which drivingly engages an idler gear 163 rotatable on a stud 164 carried in cap member 111. Idler gear 163 drivingly engages a blade drive gear 165 which is nonrotatably secured to blade 146 by means of a pin 166 extending through aligned apertures in gear 164 and blade 146 in the same manner as illustrated in FIG. 3. The drive shaft 125 in the flaying tool of FIG. 5, may be rotatably mounted within a handle in the same manner as illustrated in FIG. 2 and also arranged to be driven in like manner to the drive shaft 25 of FIG. 2.

Since the bevel gears 134 and 160, associated with the drive mechanism for each of the blades 140 and 146 are drivably engaged by beveled pinion 133 on opposite sides of bevel pinion 133, the bevel gears 134 and 160 will be driven in opposite directions of rotation. Inasmuch as the drive mechanism connecting each of the bevel gears 134 and 160 to its associated blade 140 and 146 are identical, the blades 140 and 146 will therefore be rotated in opposite directions.

Flaying tools embodying the invention provide several significant advantages over flaying tools using oscillatory blades. Counter rotating blades allow more cuts per unit time, that is, more passages of the cutting edges of the teeth 53 or 153 with the same speed of the drive shaft 25 or 125. This is also true of the arrangement using a single rotating blade and a stationary blade as illustrated in FIGS. 1-4. Moreover, since the direction of movement of each of the blades is uniform in one direction, and since there is no inertial stop and start forces on the blades or the driving mechanisms, therefore, there will be considerably less wear on the parts, and less vibration of the flaying tool with resulting less operator fatigue. Also, since the cutting edges of the blades are moving at a constant velocity and do not have to stop and reverse direction, there will be more cutting action and therefore more cutting efficiency with rotating blades. Furthermore, inasmuch as the entire periphery of the rotating blades are used in cutting, the disclosed flaying tools will have longer operating periods before the blades have to be removed from the tool to be resharpened, as compared to flaying tools using oscillatory blades where only a portion of the cutting teeth are utilized.

The invention, for purposes of disclosure, has been illustrated and described in preferred forms thereof which efficiently attain the objects of the invention set forth above and those made apparent from the specification. However, modifications to the disclosed embodiments of the invention as well as other embodiments thereof may occur to those skilled in the art which do not depart from the spirit and scope of the invention. Accordingly, it is intended to cover in the appended claims all modifications to the disclosed embodiments of the invention and other embodiments thereof which do not depart from the spirit and scope of the invention.

What is claimed is:

1. A flaying tool comprising a frame, a pair of superimposed disk-like blades, means mounted on said frame providing a common axis for said blades, said blades having peripheral cooperating teeth, a gear secured to one of said blades for rotation therewith about said axis, a rotatable drive shaft extending longitudinally of said frame, a pinion mounted on said shaft, gear means rotatably mounted on said frame drivably connecting said pinion and said gear, a plate member secured to the other of said blades having a slot defined therein, and a pin member in said frame extending into said slot to prevent rotation of said other of said blades.

2. The tool of claim 1 including means biasing the edges of said blades together.

3. A flaying tool comprising a frame, a pair of superimposed disk-like blades, means mounted on said frame providing a common axis for said blades, said blades having peripheral cooperating teeth, a gear secured to one of said blades for rotation therewith about said axis, a rotatable drive shaft extending longitudinally of said frame, a pinion mounted on said shaft, gear means rotatably mounted on said frame drivably connecting said pinion and said gear, a plate member secured to the other of said blades having a slot defined therein opening on the periphery of said plate member, and a pin member in said frame extending into said slot to prevent rotation of said other blade.

4. A flaying tool comprising a frame, a pair of superimposed disk-like blades, means mounted on said frame providing a common axis for said blades, said blades having peripheral cooperating teeth, a gear secured to one of said blades for rotation therewith about said axis, a rotatable drive shaft extending longitudinally of said frame, a pinion mounted on said shaft, gear means rotatably mounted on said frame drivably connecting said pinion and said gear, a plate member secured to the other of said blades having a slot defined therein, said plate member being adjacent said other of said blades and mounted about said axis-providing member, and a pin member in said frame extending into said slot to prevent rotation of said other blade.

References Cited in the file of this patent
UNITED STATES PATENTS

| | | |
|---|---|---|
| 2,974,413 | Williams | Mar. 14, 1961 |

FOREIGN PATENTS

| | | |
|---|---|---|
| 246,599 | Germany | May 6, 1912 |
| 888,373 | Germany | Aug. 31, 1953 |
| 773,444 | Great Britain | Apr. 24, 1957 |